United States Patent [19]

Ireland et al.

[11] Patent Number: 4,647,491
[45] Date of Patent: Mar. 3, 1987

[54] CORRUGATED LANDSCAPING EDGING

[75] Inventors: Daniel T. Ireland; James B. Foster, both of West Bloomfield, Mich.

[73] Assignee: Flexpak Co., Farmington Hills, Mich.

[21] Appl. No.: 679,540

[22] Filed: Dec. 7, 1984

[51] Int. Cl.$^4$ .......................... B32B 3/28; A01G 1/08
[52] U.S. Cl. ...................................... 428/137; 47/32; 47/33; 428/178; 428/182; 428/186; 428/192
[58] Field of Search ............... 428/186, 178, 182, 184, 428/137, 192; 47/32, 33

[56] References Cited

U.S. PATENT DOCUMENTS

| | | | |
|---|---|---|---|
| 1,584,589 | 5/1926 | Adams | 47/32 |
| 2,436,770 | 2/1948 | Hill et al. | 47/33 |
| 2,822,644 | 2/1958 | Berger | 47/32 |
| 2,842,344 | 7/1958 | Todd | 256/21 |
| 2,877,600 | 3/1959 | Slate | 47/33 |
| 3,415,013 | 12/1968 | Galbraith | 47/33 |
| 3,472,133 | 10/1969 | Ziehm, Jr. | 47/33 |
| 3,541,726 | 11/1970 | Raschke, Jr. | 47/33 |
| 3,545,128 | 12/1970 | LaFontaine et al. | 47/33 |
| 3,841,022 | 10/1974 | Thodos | 47/33 |
| 4,267,223 | 5/1981 | Swartz | 428/186 |
| 4,281,473 | 8/1981 | Emalfarb et al. | 47/33 |

FOREIGN PATENT DOCUMENTS 253367 6/1926 United Kingdom .................. 47/33

*Primary Examiner*—Paul J. Thibodeau
*Attorney, Agent, or Firm*—Harness, Dickey & Pierce

[57] ABSTRACT

A landscaping edging material is described preferably made from a polymeric plastic material and formed having a planar face surface which is attached or integrally formed with a corrugated central web portion. The edging is placed on the ground surface or partially below the ground surface to delocate boundaries of lawn or garden areas or provide an effective landscape retainer to contain dirt, bark, chips, stones or the like in a confined area. The edging is retained in position by using a plurality of stakes which are inserted normally by hand into the ground through the elongated channels formed between the planar face surface and the central web portion. The stakes preferably have reverse loops that are then placed into an adjacent channel to add security and enhance the aesthetic appearance of the edging. A "hair pin" connector stake is employed to connect two sections of edging or the two ends of a section forming a circular pattern.

In accordance with second and third embodiments of this invention, a corrugated material is employed having a pair of planar face surfaces separated by a corrugated central web portion.

The edging of this invention is aesthetically attractive, cost effective, durable, easy to install without tools over any terrain, and can be readily formed to the desired border contour, and easily cut to size to fit any landscaping requirement. Additionally, the material provides excellent rigidity in the vertical plane and withstands impact from lawn mowers, trimmers, and the like.

Additionally, the edging can be increased to width to various sizes enabling it to be placed in the ground to impede grass and plant growth, or to be used for fencing and wind breaks, etc.

12 Claims, 15 Drawing Figures

U.S. Patent   Mar. 3, 1987   Sheet 1 of 3   4,647,491
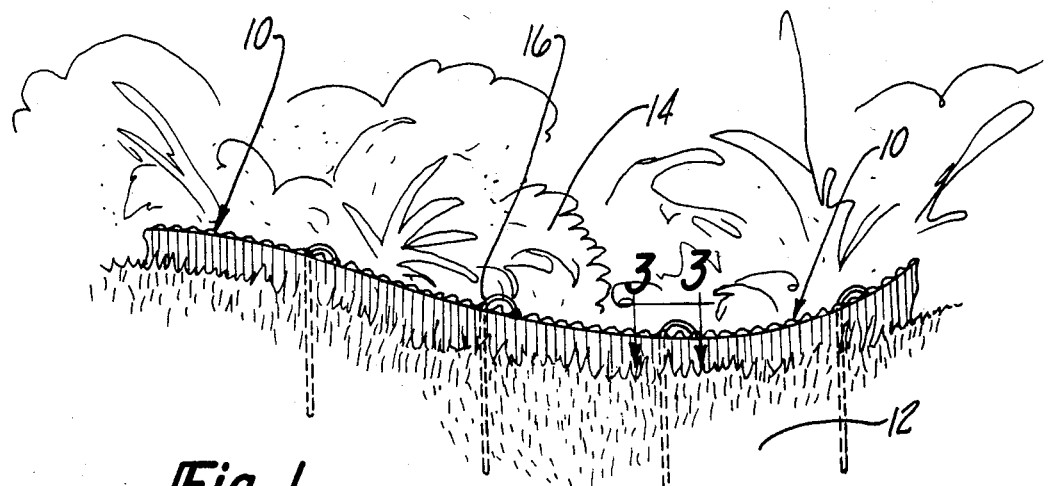
Fig-1
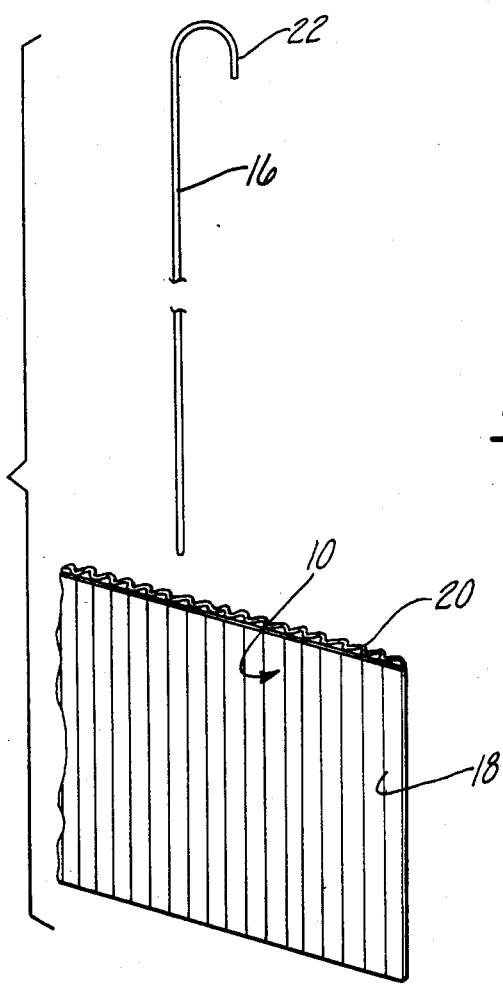
Fig-2
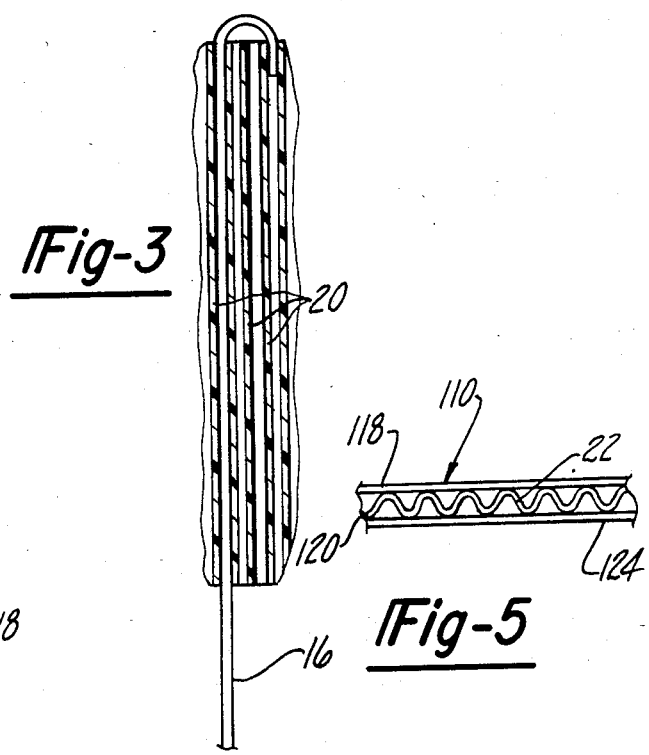
Fig-3
Fig-5

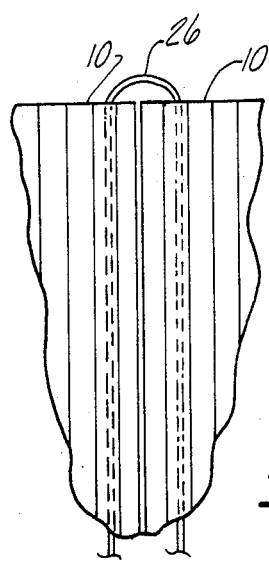
Fig-4
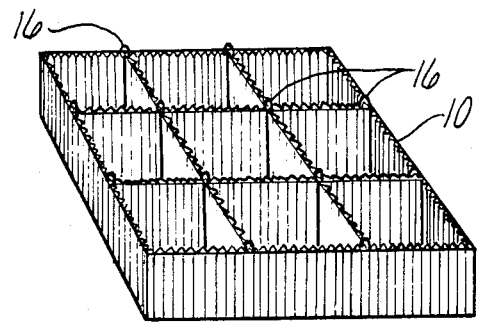
Fig-14
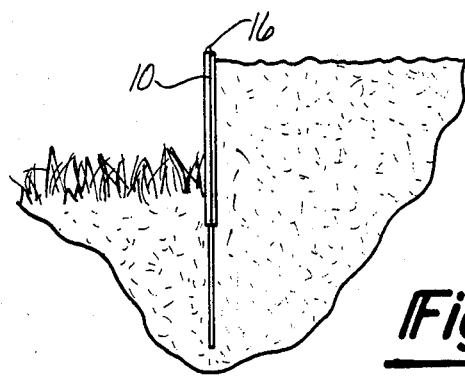
Fig-7
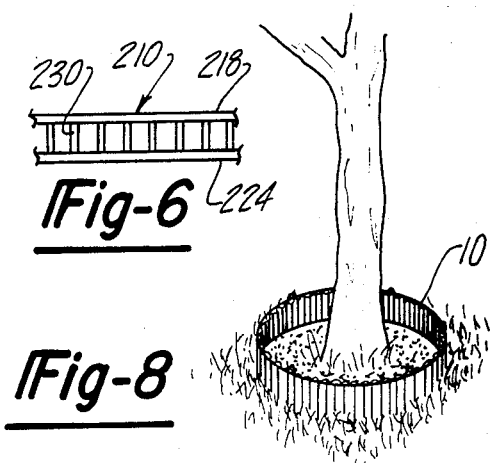
Fig-6
Fig-8
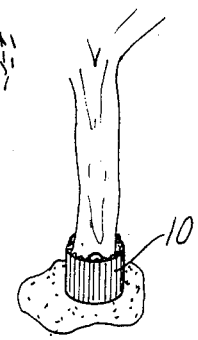
Fig-9
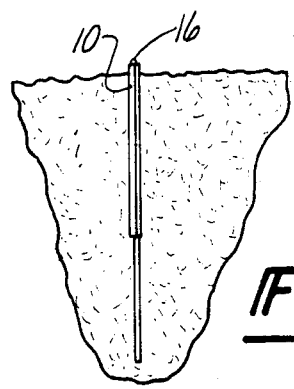
Fig-10
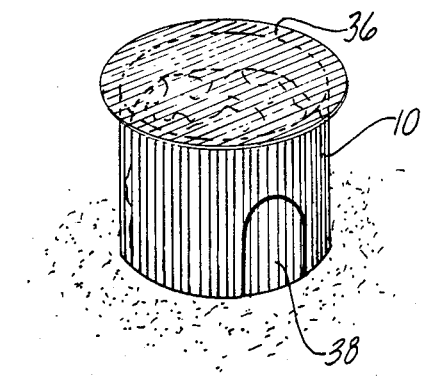
Fig-13
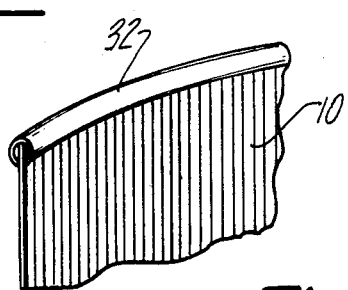
Fig-15

CORRUGATED LANDSCAPING EDGING

BACKGROUND AND SUMMARY OF THE INVENTION

This invention relates to a lawn and garden product and particularly, to an improved edging and landscape retainer or bed divider useful for defining borders between adjacent areas of a lawn or garden; or to act as a landscape bed retainer to contain dirt, stones, bark, chips, or the like, in designated areas and to prevent spillover of such materials into areas where it is not intended.

Homeowners and landscapers often desire to use edging to separate and define gardens from turf grass areas; to divide portions of gardens, or to develop multiple layers of soil for building a topiary garden arrangement. Typically, landscape edging material is formed in elongated strips which are placed along the border to be defined and implanted into the ground. Once installed, the edging acts as a delineation which inhibits vegetation growth between the adjacent ground areas. The use of edging further simplifies trimming and enhances the appearance of the landscape and garden areas.

A landscape edging product should advantageously possess the desirable features set forth below. Each of these features are fulfilled by a landscape edging according to this invention.

A landscape edging should be sufficiently flexible and resilient so that it may be easily bent in either direction and shaped or formed by hand, and be readily adapted to contours, curvatures and irregular shapes of the garden border, and the undulations and configuration of the landscape.

It is desirable for the edging to be sufficiently rigid in the vertical plane to remain in an upright position when impacted by external forces such as lawn mowers, trimmers, or the like.

The landscape should also be easily installed without tools and accessories, eliminating the arduous and time consuming trenching, implanting, fitting, and compacting associated with existing edging materials available in the market today.

It is desirous for a landscape edging to be readily cut to size with a knife or scissors to fit any designated area.

It is desirable for an edging material to have the ability to add holes for ventilation or air circulation when used in the wider widths for fencing or as wind breaks.

It is advantageous for landscape edging to be easily shipped and stored and have the ability to be rolled into a tight coil, yet will not remain so rigid in coil form so as to hinder installation when placed along straight paths or contours which curve in the opposite direction of the coil.

It is desirable to provide a landscape edging that can be easily installed, without digging and trenching, over hard packed ground, over rough and rocky terrain, or over submerged tree roots or the like, eliminating the need to cut or remove such obstacle, and eliminating the damage and destruction of valuable plant material when roots are severed or the ground is disrupted.

It is desirable to provide edging material that may be installed year around and is not adversely affected by cold or inclement weather.

It is desirable for edging material to be securely fastened in the ground to limit lateral shifting.

It is desirable for edging material to be secured in the ground to limit vertical movement, either pulling up out of the ground or sinking below grade thereby becoming ineffective.

It is further desirable for edging to be easily extractable, to facilitate trimming or edging adjustment or relocation.

It is further advantageous for a landscape edging that becomes dislodged to be quickly and easily reinserted and put back into place.

It is further desirable for edging to be readily attachable to another section to provide a continuous interlocking barrier, in an easily applied and effective manner, that is pleasing in appearance.

It is advantageous for a landscape edging to be durable, rust proof, non-corrosive and weather resistant.

It is advantageous for a landscape edging to be reusable if so desired.

It is desirable to provide an edging material that is able to withstand normal impact and contact with lawn mowers, trimmers, and the like, without splitting and deterioration.

It is desirable for a landscape edging to enhance the aesthetic appearance of the lawn or garden area, and act as a decorative highlight for the particular landscaping application.

It is also desirable to provide an edging material available in multiple color ranges to coincide with various landscaping situations.

It is desirable to have an edging material that is available in various widths for a wide range of uses.

It is advantageous for a landscape edging to be available in multiple lengths for bulk requirements or special applications.

It is also desirous to have an edging material having a corrugated inner layer that is available in a single face material as well as a double face material to add rigidity or additional strength where flexibility is not as important, or for special applications such as the retention of flowable concrete, as in construction forms or as expansion joints to allow for the normal expansion and contraction of concrete caused from climatic changes or many other special uses.

It is also desirous to have a heavier gage material available to gain additional vertical and lateral strength and extra rigidity when needed for a particular application.

It is further desirable to be able to stack the edging material one section on top of the other by driving a connecting stake or pin through both top and bottom portions if the application warrants, such as a need to increase the height of the edging or to increase the edging retention capacity.

The above desirable features of a landscape edging are provided in accordance with this invention. The edging material most advantageously employed in practicing this invention is a material having one or two facing layers with a corrugated web layer attached thereto. Preferably, the edging material is made from polyethylene, polypropylene, PVC, polycarbonate or other polymeric or co-polymer material.

In accordance with this invention, elongated stakes preferably made from a painted or galvanized wire stock with one end forming a "U" shaped return of approximately 1", spaced approximately ¾" from the stake body, may be inserted through one or more of the hollow elongated cavities found within the edging material, formed between the planar face or faces and the center web section or corrugations, and running the full length of the edging material. The bottom portion of the stake is pushed into the ground, thereby securing the edging in the desired position along the ground. The end of the "U" return is then preferably inserted back through one of the other parallel channels found within the edging, or hooked over the side of the edging. When the "U" return is inserted back through one of the other channels, the entire stake is within the edging and does not detract from the appearance of the edging material.

The flexible nature of the edging material enables it to be easily bent in either direction and conform to any border shape, yet the corrugations provide vertical strength and integrity and resist bending in the vertical plane, thereby ensuring that the border face maintains a rigid vertical orientation.

The landscape edging according to this invention is further adaptable for numerous other landscaping uses such as soil retainers, rose or shrub collars, tree guards, wind breaks, screens, fences, composters, container gardens, cold frames, and many more.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a pictorial view of the landscape edging according to this invention shown positioned along a garden border and held in position by a plurality of stakes which are partially shown in phantom lines;

FIG. 2 is a pictorial view of a segment of landscape edging according to this invention shown with an associated retaining stake shown in a position prior to insertion within the edging;

FIG. 3 is a cross-sectional view taken along line 3—3 of FIG. 1 showing a stake inserted within an elongated cavity of the landscape edging material for retaining the edging in position;

FIG. 4 is a front view showing a one-piece "hair pin" connector stake inserted within a channel from each section of the edging joining the two sections in one continuous interlocking barrier;

FIG. 5 is a cross-sectional view of a second embodiment according to this invention showing a modified landscape edging having a pair of opposing planar face surfaces separated by a corrugated central web;

FIG. 6 is a cross-sectional view of a variation of the second embodiment according to this invention showing a modified landscape edging material having a pair of opposing planar face surfaces separated by a perpendicular corrugated central webs;

FIG. 7 is a pictorial view of the landscape edging according to this invention used as a barrier for the retention of dirt, stones, chips, bark, etc. and the containment of same within a restricted area;

FIG. 8 is a pictorial view of the edging according to this invention showing a circular landscaping device or collar for trees, seedlings, shrubs, roses, etc., employing a hair pin connector to join the ends of the edging together;

FIG. 9 is a pictorial view of the edging according to this invention showing a circular protective device fitting snugly against the trunk or stem of a tree;

FIG. 10 is a pictorial view of a wider section of the edging material according to this invention showing the insertion of the edging approximately 4-5" into the ground in the conventional manner to prevent grass and plant life from rooting and spreading into unwanted areas;

FIG. 13 is a pictorial view of the edging material according to this invention showing use of the wider material, approximately 18-24", as a composter, with a lid being either hinged or secured with pins driven through the lid into the channels of the sides of the composter, and a door, which provides easy access to the composted material;

FIG. 14 is a pictorial view of the edging material made preferably with the second and third embodiments of this invention having a pair of opposing planar face surfaces separated by a central web section showing its use as a container with approximately a 6" rectangular or square frame with interior partitions, making a cold frame or raised bed garden sectioned off into specific compartments, otherwise known as container gardening or intensive gardening; and FIG. 15 illustrates the use of a crown tubular member which may be installed along the upper edge of the landscape edging to enhance its appearance and conceal joints between edging sections.

DETAILED DESCRIPTION OF THE INVENTION

Figure 11:
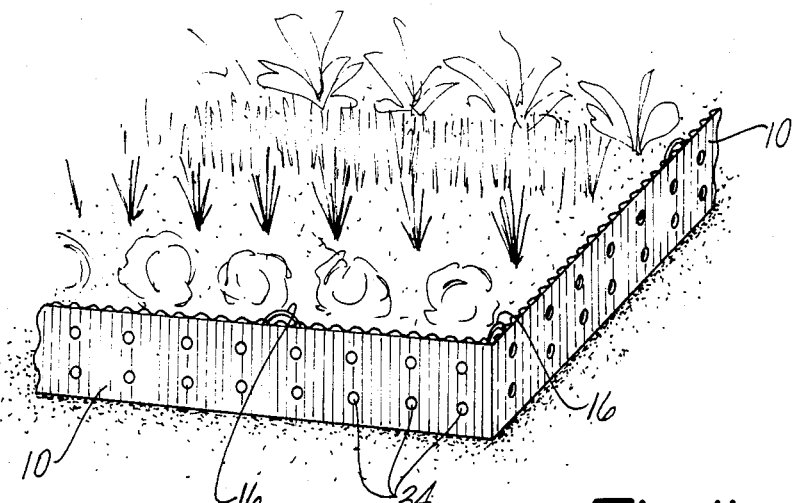
FIG. 11 is a pictorial view of the landscape edging extended to 18-24", or wider, for use as a fencing material, with air circulation holes, employing the same staking technique previously desribed.

A landscape edging according to a first embodiment of this invention is particularly shown by FIGS. 1-3 and is generally designated by reference character 10. Edging 10 is shown as providing a separating boundary between lawn area 12 and garden 14 as shown by FIG. 1. FIG. 1 further illustrates the preferred means for fastening landscape edging 10 along the desired contour using a plurality of elongated stakes 16, which secure the edging material to the ground. The lower edge of edging 10 is preferably at ground level or partially submerged to enhance its anchoring with the ground.

The construction and configuration of the various elements according to this invention are best explained with reference to FIGS. 2 and 3. In accordance with a first embodiment of this invention, landscape edging 10 includes a substantially planar face surface 18 which is bonded or otherwise attached to corrugated central web portion 20. Such bonding between web portion 20 and face surface 18 can be accomplished using adhesives or heat fusion bonding. Alternately, edging 10 could be formed as a integral structure using a process such as extrusion. Landscaping edging 10 is preferably formed from a polymeric or co-polymer plastic material such as polyethylene. Alternately, polypropylene, polycarbonate or other similar materials could be used. Edging 10 may be installed with the corrugations 20 or planar face 18 facing outward, as desired.

Any material used for landscape edging 10 would preferably include an ultraviolet light inhibitor to extend the useful life of the panel by minimizing degradation caused by solar radiation. Due to the corrugated form, the lawn edging 10 can be easily bent about axes which are parallel with the corrugation of central web portion 20. However, edging 10 exhibits high resistance to bending about axes parallel to the ground surface. These bending characteristics are particularly desirable features for a landscape edging since it is desirable to enable the edging to be bent or shaped to the desired border contour yet remain resistance to bending along the ground surface. The structural characteristics of edging 10 further enable it to be easily and compactly stored by rolling it in the form of a coil.

Landscape edging 10 is preferably secured in position by using one or more stakes 16. Stakes 16 are preferably formed from a painted or galvanized wire stock and include an end with a "U" shaped return 22. Stakes 16 may be inserted within any one of the elongated channels formed between central web portion 20 and planar face surface 18 and into the ground below. The end of the "U" shaped return may be inserted back through a parallel channel to more effectively hold in place the edging and to enhance the aesthetic appearance of the edging. Since stakes 16 are almost entirely enclosed within edging 10, they do not detract from the natural setting of the landscape. Additionally, the elongated channels within edging 10 form a guide for the insertion of stakes 16 and once inserted, the stakes add rigidity and reinforcement and help prevent bending or distortion of the edging.

Due to the guiding effect of the channels within edging 10, stakes 16 are directed perpendicularly into the ground and may be made of narrower gauge stock than stakes which are unsupported, thereby decreasing costs and simplifying stake forming. As many of stakes 16 as needed to retain the desired shape may be employed. It may be desirable for the user to locate more stakes along segments of edging 10 where it is highly curved as compared with generally straight sections, or where greater retention strength is needed. Using edging 10 and stake 16, it is possible to produce very sharp bends, such as a 90-degree corner by using several stakes on either side of the corner, or to make circular formations using the stakes at each end to join the circular pattern together.

The "U" shaped return 22 of stake 16 serves to enable the stake to be withdrawn when desired for edging relocation, and further helps secure edging 10 and prevents edging from being removed without intentionally pulling stakes 16 from the appropriate channels.

Due to the fact the stakes are the primary mechanism used to secure the edging into the ground, and not the edging material itself as with some existing types of edging material available prior to this invention, the edging may be of narrower width and lighter gage than conventional edging materials, thereby decreasing costs and simplifying the installation process.

FIG. 4 illustrates another type of stake which may be employed in connection with this invention. The "hair pin" connector stake 26 has a pair of ends of equal length which pass through channels formed by central web portion 20, and are both secured into the ground to hold the edging in place. Connector stake 26 is particularly useful for easily and effectively connecting two sections of edging 10, in a continuous interlocking barrier, or for use in holding a section of edging in a circle.

FIG. 5 illustrates a second embodiment of edging 110 according to this invention. Edging 110 is identical to edging 10 except that an additional planar face portion 124 is provided so that a pair of such surfaces are separated by corrugated central web portion 120. Edging material 110 offers the same advantages as that described in connection with edging 10, except it lacks the ability to be as easily formed and adapted to curves and irregular shapes in the landscape. Edging material 110 may be preferred, however, in instances where greater rigidity is needed or where the user prefers its appearance.

FIG. 6 illustrates a variation of the second embodiment according to this invention. According to this third embodiment, edging material 210 employs a pair of spaced planar face surfaces 218 and 224 with a plurality of spaced web sections 230 extending between the face portions at right angles thereto. In use, edging 210 would be employed like the first and second embodiments in that stakes 16 and 26 are inserted within the elongated cavities formed between the web portions.

FIGS. 7 through 14 illustrate various additional uses for edging materials according to this invention. Although these Figures illustrate various applications for edging 10, edging configurations according to the second and third embodiments of the invention could also be employed.

FIG. 7 illustrates edging 10 used in developing a topiary type garden arrangement. Edging 10 acts as a barrier to prevent soil or material on one side of the edging from spilling over onto ground on the other side of the edging.

FIG. 8 shows edging 10 used to encircle a tree trunk, or plant material, for landscaping purposes. Ends of edging 10 would preferably be connected using "hair pin" connecter stake 26. Any diameter tree, shrub, etc. can be protected by merely cutting the material to size and bending the edging around the tree in a circular fashion, and inserting stakes 16 and "hair pin" connector 26 into the end channels and joining them to complete the enclosure.

FIG. 9 shows edging used primarily as a protective guard for trees, seedlings, or plant material that fits snugly around trees and specifically offers protection from lawn mowers, trimmers, and the like, as well as protection from rodents and other pests.

FIG. 10 shows edging 10 being substantially submersed into the ground surface to prevent root spreading of plants.

FIG. 11 illustrates edging 10 being used to enclose a specific area as fencing. This fencing may be used around garden areas or plots to keep out rodents, animals and pests, and when made from transluscent materials, allows the available light into the fenced area, and enhances seed germination, plant propagation, and early vegetable production. For this application, edging 10 may be provided with a plurality of holes 34 which permit air circulation. It can also serve as snow fencing privacy screens, help control erosion, and provide many other screening or fencing functions.

Figure 12:
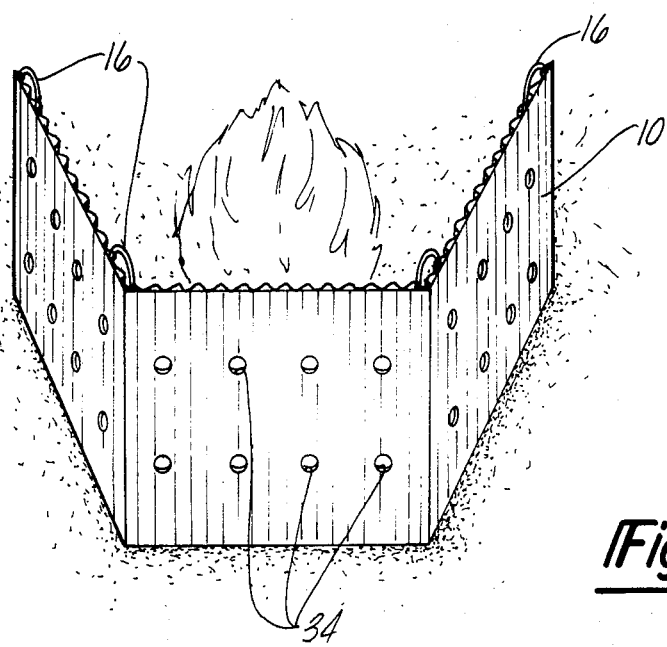
FIG. 12 is a pictorial view of the landscape edging extended to 18-24" or wider for use as a wind break to prevent winter damage to plants, utilizing the same staking technique previously described and having holes throughout for sufficient air circulation.

FIG. 12 illustrates edging 10 having a greater height being used as a wind break to provide protection for vegetation. It is intended to protect delicate plants such as rhododendrons, azaleas, and many other plants and shrubs from wind damage, especially the winter wind which causes dehydration and can result in "winter kill". Such a protective device may have holes 34 to allow air circulation. Preferably for this application, edging 10 should be taller than the plant material to screen the vegetation from the wind and offer maximum protection.

FIG. 13 illustrates the edging 10 having a greater height for use as a composter. The translucent nature of the material transmits the available light and increases the humidity and inside temperature, and enhances and expedites the decomposition process. The composter should have a detachable lid 36 that is either hinged and/or secured with pins driven through the top into the channels within the edging material 10. The composter should also have a door 38 located at the bottom providing easy access and removal of the composted material with a shovel.

FIG. 14 shows the edging material, preferably the second embodiment 110, or the third embodiment 210, used as a container, with a square or rectangular frame wtih interior partitions. Such a container makes an ideal cold frame, or raised bed, or container garden, generally known as intensive or container gardening, whereby various species of plants or vegetables may be segregated and grown within individual compartments. This system utilizes the same staking method previously described to secure the unit in the ground, and should incorporate a removable top 40 (not shown) that is hinged or secured with pins driven through the top into the channels inherent within the edging material 110 and/or 210. Such top 40 should preferably be made from edging material 10, which would allow it to be rolled up out of the way, and be of translucent nature to transmit the available light and increase the inside humidity and temperature, which will extend the growing season and protect the plant material from the elements.

FIG. 15 shows the use of tubular crown molding 32 which may be aesthetically desired since it acts to hide joints between sections of edging and adds a decorative rounded top edge. Crown molding 32 is formed from an elongated tube having a longitudinal split which is spread apart for installation.

While the above description constitutes the preferred embodiments of the present invention, it will be appreciated that the invention is susceptible to modification, variation and change without departing from the proper scope and fair meaning of the accompanying claims.

What is claimed is:

1. A multipurpose landscaping edging assembly adapted for delineating boundaries between garden and lawn areas, developing topiary garden arrangements, protecting plants and for developing diverse garden structures, said edging positioned by one or more stakes, said edging comprising, in combination:
    a landscaping edging material having,
    a planar face surface and
    a central web portion forming corrugations, said central web and said planar face surface cooperating to define a plurality of closely spaced parallel channels whereby said edging is relatively flexible about axes parallel to said corrugations and relatively stiff about axes normal to said corrugations; and
    a stake having a first substantially straight elongated portion for insertion into a first edging channel and into the ground and having a reversely bent loop with a second substantially straight portion for insertion into a second edging channel thereby fastening said edging material to the ground.

2. A multipurpose landscaping edging assembly according to claim 1 wherein said stake is formed from metal wire stock.

3. A multipurpose landscaping edging assembly according to claim 1 wherein said stake second substantially straight portion is elongated for insertion into said second edging channel and into the ground whereby said stake may be used to connect two separate pieces of said edging.

4. A multipurpose landscaping edging assembly according to claim 1 wherein said edging further defines a plurality of holes through said face surface and central web portion for providing air circulation.

5. A landscaping edging assembly according to claim 1 wherein the assembly further comprises a tubular crown member having a longitudinal split enabling said member to be inserted over an upper edge of said edging.

6. A multipurpose landscaping edging assembly adapted for delineating boundaries between garden and lawn areas, developing topiary garden arrangements, protecting plants and for developing diverse garden structures, said edging positioned by one or more stakes, said edging comprising, in combination:
    a landscaping edging material having;
    a first planar face surface,
    a second planar face surface, parallel to and spaced from said first planar face surface, and
    a central web portion forming corrugations, said central web attached to said first and second planar face surfaces, said central web and said first and second planar face surfaces forming a plurality of closely spaced parallel channels, whereby said edging is relatively flexible about axes parallel to said corrugations and relatively stiff about axes normal to said corrugations, and
    a stake having a first substantially straight elongated portion for insertion into a first edging channel and into the ground and having a reversely bent loop with a second substantially straight portion for insertion into a second edging channel thereby fastening said edging material to the ground.

7. A multipurpose landscaping edging assembly according to claim 6 wherein said stake is formed from metal wire stock.

8. A landscaping edging assembly according to claim 6 whereby said stake second substantially straight portion is elongated for insertion into said second edging channel and into the ground whereby said stake may be used to connect two separate pieces of said edging.

9. A landscaping edging assembly according to claim 6 wherein the assembly further comprises a tubular crown member having a longitudinal split enabling said member to be inserted over any upper edge of said edging.

10. A landscaping edging assembly according to claim 6 wherein said edging further defines a plurality of holes through said face surface and central web portion for providing air circulation.

11. A multipurpose landscaping edging assembly adapted for delineating boundaries between garden and lawn areas, developing topiary garden arrangements, protecting plants and for developing diverse garden structures, said edging positioned by one or more stakes, said edging comprising, in combination:
    a landscaping edging material having,
    a planar face surface and
    a central web portion forming corrugations, said central web and said planar face surface cooperating to define a plurality of closely spaced parallel channels whereby said edging is relatively flexible about axes parallel to said corrugations and relatively stiff about axes normal to said corrugations;
    a stake thereby fastening said edging material to the ground, and a tubular crown member having a longitudinal split enabling said member to be inserted over an upper edge of said edging.

12. A multipurpose landscaping edging assembly adapted for delineating boundaries between garden and lawn areas, developing topiary garden arrangements, protecting plants and for developing diverse garden structures, said edging positioned by one or more stakes, said edging comprising, in combination:

a landscaping edging material having;

a first planar face surface, a second planar face surface, parallel to and spaced from said first planar face surface, and a central web portion forming corrugations, said central web attached to said first and second planar face surfaces, said central web and said first and second planar face surfaces forming a plurality of closely spaced parallel channels, whereby said edging is relatively flexible about axes parallel to said corrugations and relatively stiff about axes normal to said corrugations, a stake adapted to be inserted within said channels thereby fastening said edging material to the ground, and a tubular crown member having a longitudinal split enabling said member to be inserted over an upper edge of said edging.

* * * * *